(12) United States Patent
Yoshikawa et al.

(10) Patent No.: US 8,410,654 B2
(45) Date of Patent: Apr. 2, 2013

(54) MOTOR AND ELECTRONIC DEVICE USING SAME

(75) Inventors: Yuichi Yoshikawa, Osaka (JP); Hiroshi Murakami, Osaka (JP); Atsuyoshi Koshiba, Tottori (JP); Koji Kadowaki, Tottori (JP); Haruki Kato, Tottori (JP); Yasuo Kunishige, Tottori (JP)

(73) Assignee: Panasonic Corporation, Osaka (JP)

( * ) Notice: Subject to any disclaimer, the term of this patent is extended or adjusted under 35 U.S.C. 154(b) by 228 days.

(21) Appl. No.: 12/744,159

(22) PCT Filed: Dec. 11, 2008

(86) PCT No.: PCT/JP2008/003708
§ 371 (c)(1),
(2), (4) Date: May 21, 2010

(87) PCT Pub. No.: WO2009/081531
PCT Pub. Date: Jul. 2, 2009

(65) Prior Publication Data
US 2010/0244637 A1 Sep. 30, 2010

(30) Foreign Application Priority Data
Dec. 21, 2007 (JP) .................................. 2007-329713

(51) Int. Cl.
*H02K 1/14* (2006.01)
*H02K 21/22* (2006.01)

(52) U.S. Cl. ... 310/216.004; 310/216.111; 310/216.074; 310/216.064; 310/216.091; 310/216.093

(58) Field of Classification Search ................ 310/67 R, 310/216.64, 216.91, 216.93, 216.98, 216.111, 310/216.097, 216.074
See application file for complete search history.

(56) References Cited

U.S. PATENT DOCUMENTS

| | | | | |
|---|---|---|---|---|
| 4,306,922 A | * | 12/1981 | Coombs et al. | ............... 148/111 |
| 5,194,771 A | | 3/1993 | Otsuki et al. | |
| 5,783,880 A | | 7/1998 | Teshima et al. | |
| 6,160,334 A | * | 12/2000 | Teshima et al. | ............. 310/67 R |

(Continued)

FOREIGN PATENT DOCUMENTS

| CN | 1123966 A | 6/1996 |
|---|---|---|
| CN | 1388629 A | 1/2003 |

(Continued)

OTHER PUBLICATIONS

JP 11299133A machine translation Oct. 22, 2012.*

(Continued)

*Primary Examiner* — Tran Nguyen
*Assistant Examiner* — Leda Pham
(74) *Attorney, Agent, or Firm* — Brinks Hofer Gilson & Lione (57) ABSTRACT

A motor comprises a stator having a plurality of magnetic poles disposed at first predetermined intervals along an outer periphery thereof, and a rotor having a permanent magnet with poles magnetized alternately to have different polarities at second predetermined intervals and disposed rotatably around the outer periphery of the stator with a predetermined gap. The magnetic poles of the stator has extended portions formed in a manner to extend from magnetic polar bases into a direction generally parallel to the permanent magnet, and the extended portions are formed of a high-permeability magnetic steel sheet with silicon content less than 3.0 wt-%.

12 Claims, 7 Drawing Sheets

U.S. PATENT DOCUMENTS

| | | | |
|---|---|---|---|
| 6,211,584 B1 | 4/2001 | Kurosawa et al. | |
| 6,316,856 B1 * | 11/2001 | Kusaki et al. | 310/90 |
| 6,661,150 B2 * | 12/2003 | Utsumi | 310/216.034 |
| 6,803,693 B2 * | 10/2004 | Shah et al. | 310/216.008 |
| 7,265,464 B2 * | 9/2007 | Chen | 310/68 B |
| 2006/0284497 A1 * | 12/2006 | Takaki et al. | 310/51 |

FOREIGN PATENT DOCUMENTS

| | | |
|---|---|---|
| JP | 53-125002 A | 10/1978 |
| JP | 03-083480 U | 8/1991 |
| JP | 08-265994 A | 10/1996 |
| JP | 09-285044 A | 10/1997 |
| JP | 11-299133 A | 10/1999 |
| JP | 11299133 A * | 10/1999 |
| JP | 2000-278889 A | 10/2000 |
| JP | 2002-354718 A | 12/2002 |
| JP | 2003-153468 A | 5/2003 |
| JP | 2004-104929 A | 4/2004 |
| JP | 2006-304567 A | 11/2006 |

OTHER PUBLICATIONS

International Search Report for International Application No. PCT/JP2008/003708, dated Mar. 17, 2009, 2 pages.

* cited by examiner

MOTOR AND ELECTRONIC DEVICE USING SAME

This application is a 371 application of PCT/JP2008/003708 having the international filing date of Dec. 11, 2008, which claims priority to JP 2007-329713 filed on Dec. 21, 2007, the entire contents of which are incorporated herein by reference.

TECHNICAL FIELD

The present invention relates to motors and electronic devices using the motors, and more particularly to a stator structure of the motors.

BACKGROUND ART

An electronic device such as a laser printer has a paper feed roller (i.e., driven unit) coupled with a motor and disposed inside a main unit casing, and this motor drives the paper feed roller to rotate and deliver paper to a predetermined section.

A brushless DC motor is the type generally used for the above motor, which comprises a stator having a plurality of magnetic poles disposed at first predetermined intervals along an outer periphery thereof, and a rotor disposed around the outer periphery of the stator. The rotor has a structure comprising permanent magnets disposed to an inner periphery thereof with their poles magnetized alternately to have different polarities at second predetermined intervals.

The stator is also provided with an extended portion formed on each of the magnetic poles in a manner to extend from the base of the magnetic pole into a direction generally parallel to the permanent magnets for improvement of a driving efficiency.

That is, the permanent magnets are made larger in width (i.e., the width in a direction orthogonal to the circumferential direction) than a width at the base of the magnetic poles of the stator in the same direction in order to bring the permanent magnets as close as possible to a magnetic sensing element for magnetically sensing rotation of the rotor. Extended portions are so formed as to extend from bases of the magnetic poles into the direction generally parallel to the permanent magnets to increase an area where the magnetic poles of the stator confront the permanent magnets and to gain a high driving force and efficiency. Patent literature 1, for instance, discloses a technique similar to the above.

In the conventional motor, the extended portions formed to extend from the bases of the magnetic poles into the direction parallel to the permanent magnets in the manner as described above can increase the area where the permanent magnets of the rotor confront the magnetic poles of the stator. It has been believed in general that the above structure can increase the driving force, and hence improve the driving efficiency.

According to the studies made by the inventors of this application, however, it was found not necessarily possible to increase the driving force by simply providing the extended portions.

In other words, the extended portions extended from the electrodes of the stator are enlarged as much as possible since it is suggested according to the general conception that the driving force can be increased by enlarging the area where the permanent magnets of the rotor confront the magnetic poles of the stator. When the extended portions are enlarged, however, an amount of magnetic flux from the confronting permanent magnets also increases proportionally. This gives rise to a problem that magnetic saturation can result in magnetic circuits of the stator communicating with the magnetic poles, and it interferes with improvement of the driving force and the driving efficiency.

In addition, there occurs an eddy-current loss in the extended portions since the magnetic flux from the magnets intersects orthogonally with the extended portions. The eddy-current loss occurs due to an eddy current generated when the magnetic flux intersects a conductor so that the larger the area where the magnetic flux intersects orthogonally the more the eddy-current loss is generated. It thus causes a problem of preventing improvement of the driving force and the driving efficiency.

Patent Literature 1: Japanese Patent Unexamined Publication, No. 1997-285044

SUMMARY OF THE INVENTION

A motor of the present invention comprises a stator having a plurality of magnetic poles disposed at first predetermined intervals along an outer periphery thereof, and a rotor having a permanent magnet with poles magnetized alternately to have different polarities at second predetermined intervals and disposed rotatably around the outer periphery of the stator with a predetermined gap. The magnetic poles of this stator have extended portions formed in a manner to extend from magnetic polar bases thereof into a direction generally parallel to the permanent magnet. These extended portions are formed of a high-permeability magnetic steel sheet with a silicon content of less than 3.0 wt-%.

By virtue of the above structure, the motor of the present invention can keep magnetic circuits communicating with the magnetic poles free from magnetic saturation, thereby improving a driving efficiency and achieving a high efficiency and low power consumption.

The present invention also includes an electronic device comprising a main unit casing, a driven unit provided inside the main unit casing, and the above motor connected to the driven unit via a coupling mechanism.

DETAILED DESCRIPTION OF THE PREFERRED EMBODIMENTS

Description will be provided hereinafter of exemplary embodiments of the present invention with reference to the accompanying drawings.

First Exemplary Embodiment

Figure 1:
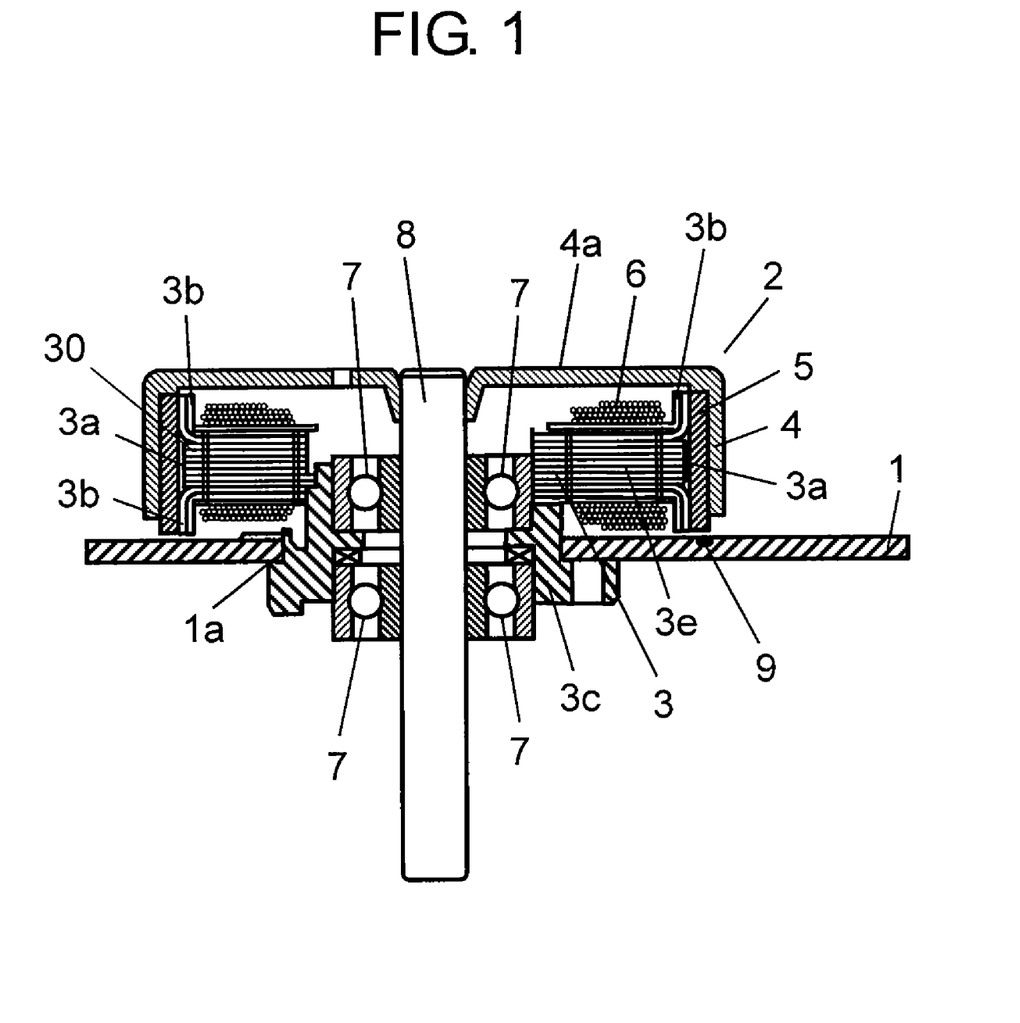
FIG. 1 is a sectional side view of a motor according to a first exemplary embodiment of the present invention.
Figure 2:
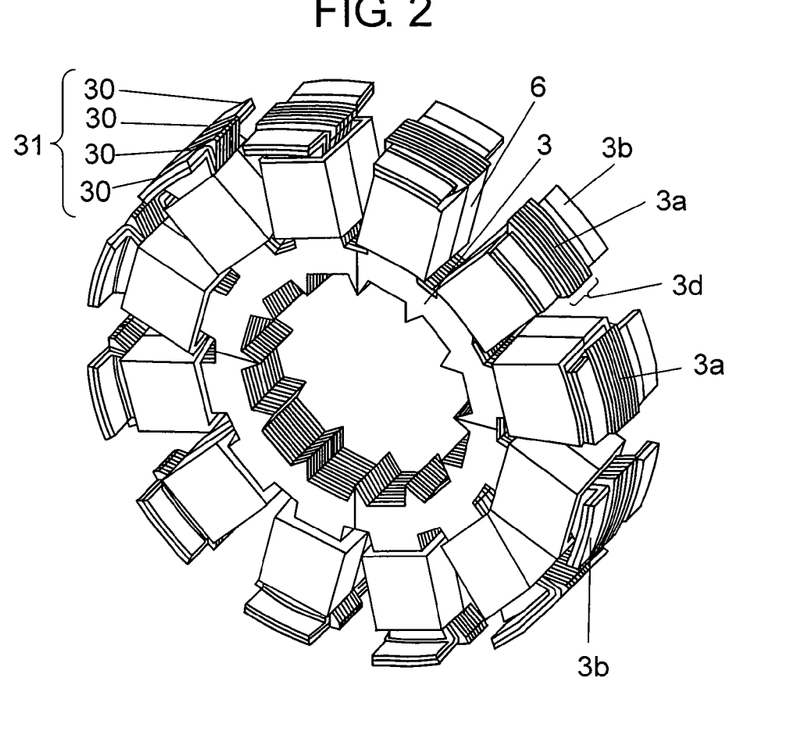
FIG. 2 is a perspective view showing a stator of the motor according to the first exemplary embodiment of the present invention.
Figure 3:
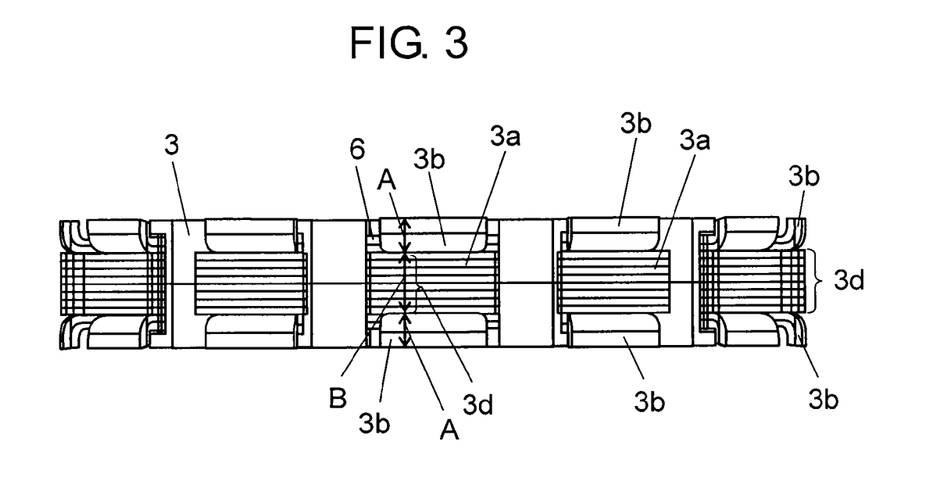
FIG. 3 is a front view showing the stator of the motor according to the first exemplary embodiment of the present invention.
Figure 4:
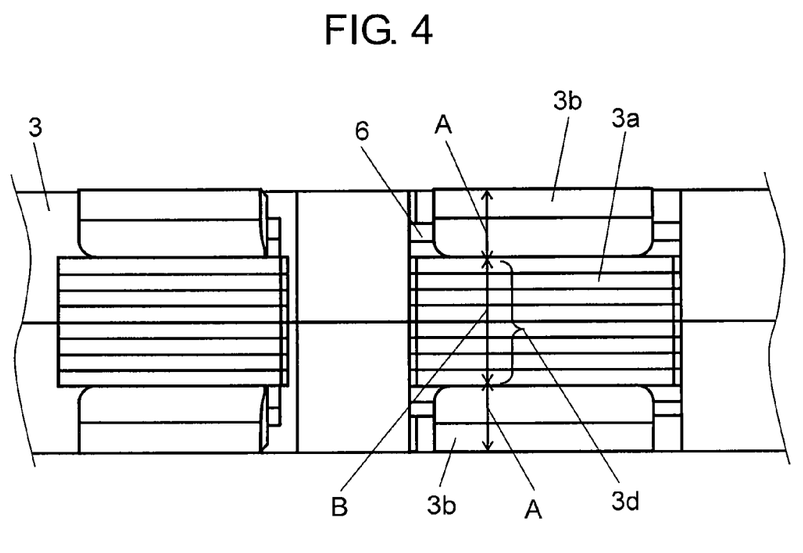
FIG. 4 is an enlarged front view showing a part of the stator of the motor according to the first exemplary embodiment of the present invention.

FIG. 1 is a cross sectional view showing a motor according to the first exemplary embodiment of the present invention, FIG. 2 is a perspective view showing a stator of the motor, FIG. 3 is a front view of the stator, and FIG. 4 is an enlarged front view of a part of the stator. Motor 2 is a so-called outer rotor type brushless DC motor.

As shown in FIG. 1, motor 2 is mounted on wiring board 1, which is disposed inside a main unit casing (not shown) of an electronic device (a laser printer, for instance).

In FIG. 1, motor 2 is disposed horizontally on wiring board 1 of an electronic device (a laser printer, for instance). Motor 2 has laminated body 31 (i.e., stator core) formed by stacking sheet-like plates 30 (e.g., silicon steel plates) as shown in FIG. 1 and FIG. 2. Motor 2 comprises stator 3 including laminated body 31, and rotor 4 disposed in a manner to confront an outer periphery of stator 3 with a gap, and rotatable around the outer periphery of stator 3. Rotor 4 is cylindrical in shape with an opening in the bottom.

Stator 3 has a plural number of magnetic poles 3a disposed along the outer periphery thereof at first predetermined intervals corresponding to the number of the magnetic poles. Each of magnetic circuits 3e at the inner side of magnetic poles 3a has coil 6 wound around it, as shown in FIG. 1 and FIG. 2. Rotor 4 is provided with permanent magnets 5 of an annular shape fixed by such means as adhesion to an inner periphery thereof, wherein permanent magnets 5 are magnetized alternately to have N- and S-polarities (i.e., different polarities next to one another) at second predetermined intervals corresponding to a number of the permanent magnets. That is, permanent magnets 5 are bonded on their outer peripheral surfaces to the inner periphery of rotor 4, so that their inner peripheral surfaces confront magnetic poles 3a of stator 3 with a gap between them.

In other words, an ac power applied to coils 6 magnetizes the individual magnetic poles 3a into N- and S-polarities alternately, and produces an attractive force and a repulsive force with respect to permanent magnets 5 at the outer peripheries thereof. These forces thus exert a rotational driving force upon rotor 4.

Stator 3 is fixed to wiring board 1 by using retainer 3c. A plurality of bearings 7 are disposed to an inner surface of stator 3, and drive shaft 8 is inserted vertically through the plurality of bearings 7. A top end of this drive shaft 8 is fixed to top plate 4a of rotor 4.

Therefore, when ac power is applied to coils 6 to magnetize the individual magnetic poles 3a alternately to have N- and S-polarities, the attractive force and the repulsive force exerted on permanent magnets 5 rotate rotor 4 around the drive shaft 8. A force of this rotation is then transmitted to a driven unit via drive shaft 8.

Also provided is Hall IC 9 as a magnetic sensing element mounted on wiring board 1 in a position corresponding to the bottom side of permanent magnets 5. Hall IC 9 senses a speed and a degree of rotation as well as a rotating position of rotor 4 to control a speed of the rotation as is well known.

Permanent magnets 5 are so shaped that their bottom sides extend near Hall IC 9 to keep them as close to Hall IC 9 as practically possible. The top sides of permanent magnets 5 are also extended upward to the same extent as the bottom sides in order to avoid a problem of loosing of the balance of permanent magnets 5 with respect to stator 3 that can otherwise result if only the bottom sides are extended downward.

In other words, the dimension of permanent magnets 5 is increased in its vertical direction. In this exemplary embodiment, the individual magnetic poles 3a of the above stator 3 are each provided with integrally-formed extended portions 3b extended vertically from magnetic polar base 3d in a direction generally parallel to the inner peripheries of permanent magnets 5 to proportionate their dimensions to that of permanent magnets 5, as shown in FIG. 1 to FIG. 3. That is, extended portions 3b are extended individually from both the top and bottom of magnetic polar base 3d in the direction generally parallel to the longitudinal axis of drive shaft 8 so that they confront permanent magnets 5 in substantially parallel to a plane generally perpendicular to orientations of there magnetic poles.

To be concrete, these extended portions 3b are formed by bending outer peripheral edges of two layers of sheet-like plate 30 including the upper and lower sides (i.e., those at the outermost layers) amongst the plurality of stacked sheet-like plates 30 that constitute laminated body 31 of stator 3 into generally right angles to both upward and downward in the direction generally parallel to the inner peripheries of permanent magnets 5.

As stated, extended portions 3b are formed by bending the outer peripheral edges of sheet-like plates 30 on both the upper and lower sides (i.e., two each of the plates including the outermost layers) amongst the plurality of stacked sheet-like plates 30 constituting stator 3 into generally right angles to both upward and downward in the direction generally parallel to permanent magnets 5. This structure increases areas of their surfaces confronting permanent magnets 5 that are also extended to both upward and downward, as shown in FIG. 1, thereby exerting a large driving force on rotor 4.

However, a total length of extended portions 3b extended to both upward and downward in the direction generally parallel to the inner peripheries of permanent magnets 5 (i.e., A+A in FIG. 3) is set not to exceed a length of magnetic polar bases 3d in the direction generally parallel to the inner peripheries of permanent magnets 5 (i.e., B in FIG. 3).

In other words, an amount of the magnetic flux entering from permanent magnets 5 increases with increase in the length (A+A) of extended portions 3b extended to both upward and downward in the direction generally parallel to the inner peripheries of permanent magnets 5. This can result in the possibility of causing magnetic saturation in magnetic circuits 3e at the inner side of individual magnetic poles 3a where coils 6 are wound.

If such magnetic saturation occurs, it becomes not possible to increase a rotational torque of rotor 4 in proportion to the increase in power applied to coils 6 and deteriorate the driving efficiency.

It was then determined as a result of various studies that, in the present exemplary embodiment, the length (A+A) of extended portions 3b extended to both upward and downward in the direction generally parallel to the inner peripheries of permanent magnets 5 is set not to exceed the length (B) of magnetic polar bases 3d in the direction generally parallel to the inner peripheries of permanent magnets 5. It was found by virtue of the above that magnetic saturation does not occur in magnetic circuits 3e at the inner side of individual magnetic poles 3a where coils 6 are wound.

In addition, a high-permeability magnetic steel sheet is used for sheet-like plates 30 to compose laminated body 31 of this exemplary embodiment. The high-permeability magnetic steel sheet composing extended portions 3b also helps reduce eddy current generated inside extended portions 3b. On the other hand, it is difficult to bend the high-permeability magnetic steel sheet because of its hardness that is generally higher than soft iron and the like materials. It becomes possible however, to make it bendable by specifying the silicon content.

Figure 5:
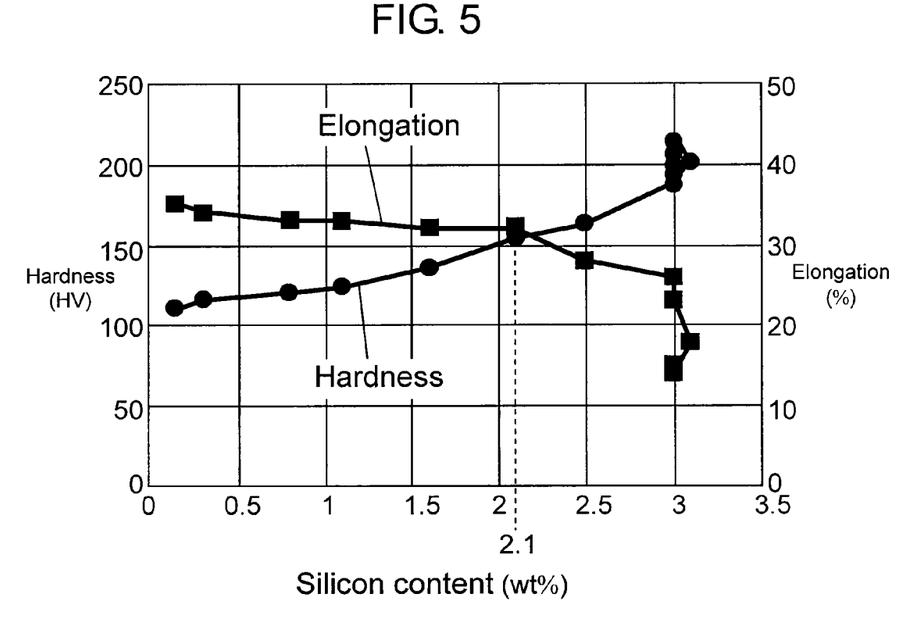
FIG. 5 is a graphic chart showing relationship of hardness and elongation with respect to silicon content in the motor according to the first exemplary embodiment of the present invention.
Figure 6:
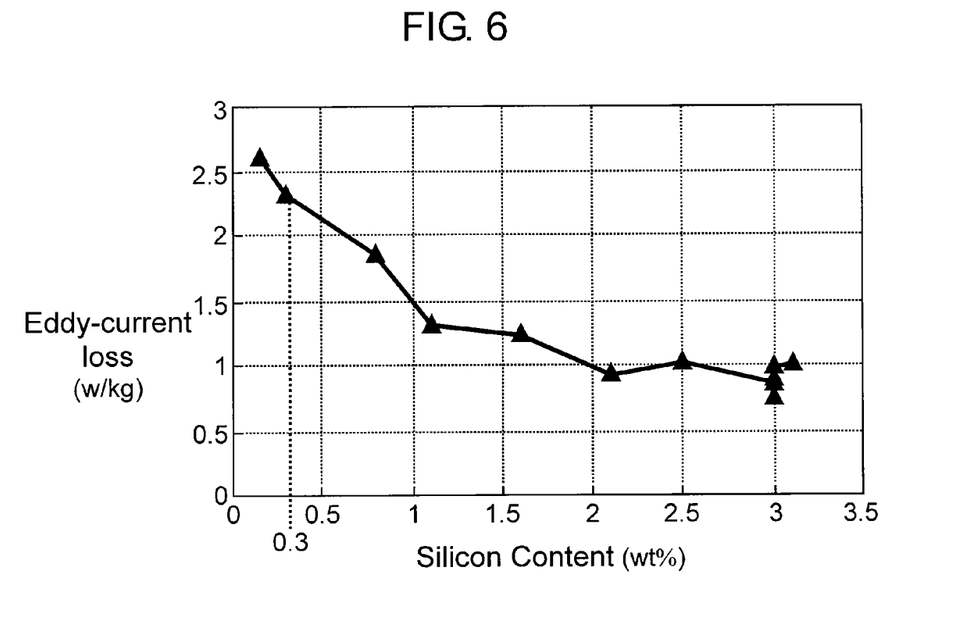
FIG. 6 is a graphic chart showing relationship between silicon content and eddy current loss in the motor according to the first exemplary embodiment of the present invention.

FIG. 5 is a graphic chart showing relationship of hardness and elongation with respect to silicon content in the high-permeability magnetic steel sheet for extended portions 3b, and FIG. 6 is another graphic chart showing relationship between the silicon content and eddy current loss. Here, the eddy current loss means a loss resulting from an eddy current generated when magnetic flux intersects a conductor.

To be noted first is the fact that both the hardness and elongation vary widely among the products measured as shown in FIG. 5, when their silicon contents reach 3.0 wt-% even though levels of their silicon contents are same or generally equal. That is, some of the products measured exhibit such phenomena that the hardness increases sharply or the elongation decreases sharply. On the other hand, there are hardly any variations from one product to another product measured when their silicon contents are below the 3.0 wt-% level. It thus becomes possible to reduce variations of the hardness and elongation by keeping the silicon content less than 3.0 wt-%.

The hardness increases steeply when the silicon content exceeds 2.5 wt-%. Contrary to the hardness, the elongation decreases steeply when the silicon content exceeds 2.5 wt-%. It is thus desirable in view of the hardness and elongation that the silicon content is set within a range of 2.0 wt-% and 3.0 wt-%

Next, the eddy current loss increases sharply when the silicon content becomes a smaller percentage than 0.3 wt-% as shown in FIG. 6. On the other hand, the eddy current loss remains nearly constant with changes in the silicon content over a range of 1.0 wt-% to 3.0 wt-%. In the light of the eddy current loss, therefore, it is desirable to have the silicon content of 0.3 wt-% or higher, and it is more desirable to keep the silicon content in the range of 1.0 wt-% to 3.0 wt-%.

Accordingly, it is desirable in consideration of the hardness, expansion and the eddy current loss that the silicon content be 0.3 wt-% or higher but less than 3.0 wt-%, and it is even more desirable to keep the silicon content in the range of 1.0 wt-% to 3.0 wt-%. That is, the high-permeability magnetic steel sheet having silicon content in the range of 1.0 wt-% to 3.0 wt-% can reduce the eddy current loss while making the process of bending and the like works easier when used as sheet-like plates 30 of extended portions 3b. According to Japanese Industrial Standard, high-permeability magnetic steel sheets having silicon contents in the range of 1.0 wt-% to 3.0 wt-% and a thickness of 0.5 mm are designated Classification Numbers of 50A400 to 50A1000. Such high-permeability magnetic steel sheets exhibit substantially low eddy current losses as compared with soft iron sheets and cold-rolled steel sheets. It is even more desirable to use a high-permeability magnetic steel sheet having silicon content in the range of 1.0 wt-% to 3.0 wt-% since such a sheet can provide outstanding advantages.

Rotor 4 that composes the motor of this exemplary embodiment is used by being driven at a rotating speed of 3,000 rpm or slower. The reason of this is as follows.

Figure 7:
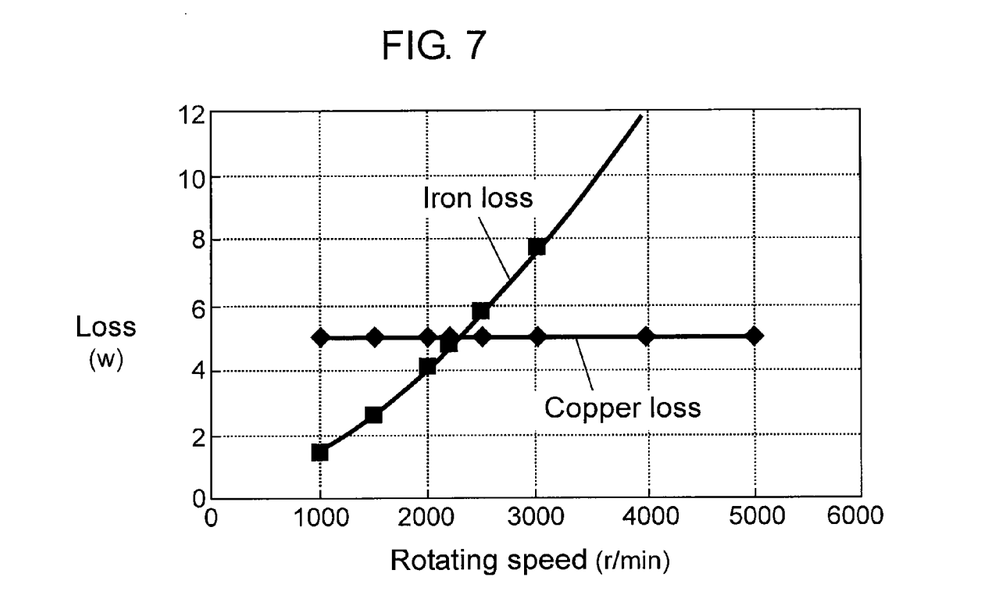
FIG. 7 is a graphic chart showing relationship of iron loss and copper loss with respect to rotational speed of the motor according to the first exemplary embodiment of the present invention.
Figure 8:
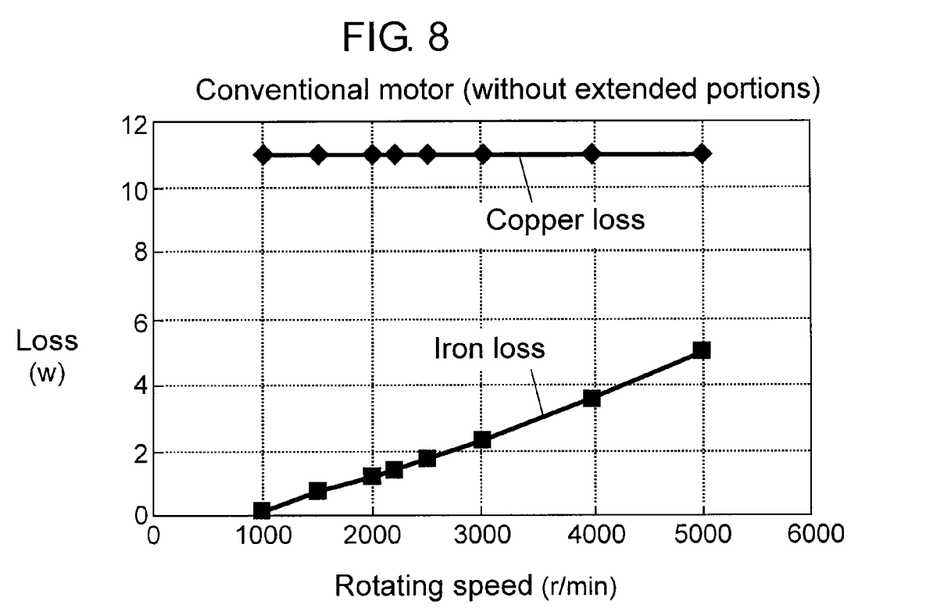
FIG. 8 is a graphic chart showing relationship of iron loss and copper loss with respect to rotational speed of a conventional motor not provided with extended portions for the purpose of comparison with FIG. 7.
Figure 9:
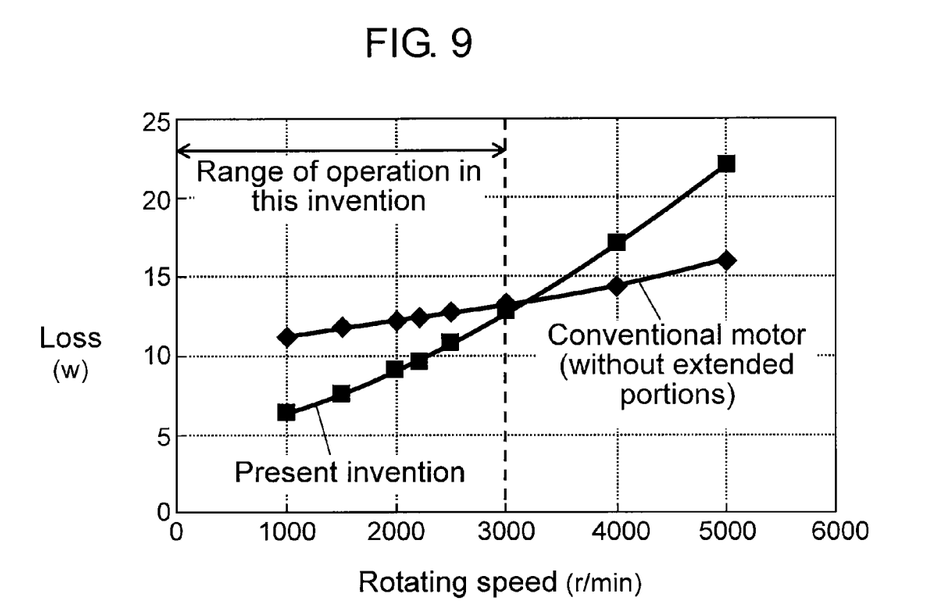
FIG. 9 is a graphic chart showing relationship between rotational speed and loss, tabulated for comparison of the motor of the first exemplary embodiment of the present invention and the conventional motor not provided with the extended portions.

FIG. 7 is a graphic chart showing relationship of iron loss and copper loss with respect to rotational speed of the motor according to the first exemplary embodiment of the present invention. FIG. 8 is a graphic chart showing relationship of iron loss and copper loss with respect to rotational speed of a conventional motor not provided with extended portions 3b for the purpose of comparison with FIG. 7. FIG. 7 and FIG. 8 show results of measurements taken by using high permeability magnetic steel sheets having a silicon content of 2.1 wt-%. In addition, FIG. 9 is a graphic chart showing relationship between rotational speed and loss W (i.e., iron loss Wfe+ copper loss Wcu), tabulated for motor 2 of the present invention and the conventional motor not provided with extended portions 3b.

Here, the iron loss Wfe represents a combined loss of hysteresis loss Wh and eddy-current loss We. The hysteresis loss Wh means a loss derived from an area encircled by a dc hysteresis loop, which is multiplied by a frequency. The eddy-current loss We means a Joule's loss attributed to the circulation of an electric current induced by an electric field generated in a magnetic material by an electromagnetic induction when magnetic flux intersects the magnetic material. The copper loss Wcu means a loss produced in a copper wire of a coil due to a resistance when an electric current is introduced into the coil.

The conventional motor not provided with extended portions 3b, as referred to herein, means a motor of the same structure as motor 2 of this invention without having extended portions 3b. In other words, absence of extended portions 3b is only the difference of the conventional motor from motor 2 of this invention.

When comparison is made of the copper losses Wcu between FIG. 7 and FIG. 8, motor 2 of the present invention shows a constant value of about 5 W whereas the conventional motor shows a constant value of about 11 W, or twice as large as that of motor 2. This difference occurs in the copper losses Wcu between motor 2 of the present invention and the conventional motor, for the reason described below.

Copper loss Wcu is in a proportional relation to the second power of electric current I, and resistance R. The relation among copper loss Wcu, electric current I and resistance R is expressed specifically by. Therefore, the copper loss Wcu changes with a change in value of electric current I to the second power when copper wires of the same size are used. Moreover, motor torque T is in a proportional relation to coefficient Kt and electric current I, and coefficient Kt has a proportional relation to amount of magnetic flux Φ. Since motor 2 of this invention has extended portions 3b, it carries magnetic flux Φ of a larger amount than the conventional motor. This results in a larger value of coefficient Kt corresponding to motor 2 of this invention than coefficient Kt of the conventional motor. An electric current I necessary for motor 2 of this invention thus becomes smaller than electric current I for the conventional motor to produce torque T of the same value. As a result, motor 2 of this invention can cut the copper loss Wcu to a smaller amount than that of the a conventional motor.

On the other hand, when comparison is made of iron losses Wfe between FIG. 7 and FIG. 8, motor 2 of this invention shows generally a constant increase at a rate of about 4 W/1,000 rpm between rotating speeds of 1,000 rpm and 4,000 rpm whereas the conventional motor shows an increase at a rate of about 2 W/1,000 rpm, or about one half that of the motor 2 of this invention. This difference occurs in the iron losses Wfe between motor 2 of the present invention and the conventional motor for the following reason.

The iron loss Wfe has a proportional relation to magnetic flux density B and rotating speed f. More specifically, iron loss Wfe is given as the sum of eddy-current loss We and hysteresis loss Wk. That is, the iron loss Wfe is expressed by, where values used for $\alpha$, $\beta$ and $\gamma$ are generally within 1.6 and 2.0.

The iron loss Wfe therefore changes with a change in value of magnetic flux density B in the case of the same rotating speed f. Because of extended portions $3b$, motor 2 of the present invention tends to take a large amount of the magnetic flux, and bears a larger magnetic flux density B than that of the conventional motor. The iron loss Wfe of motor 2 of the present invention hence becomes larger than that of the conventional motor.

Comparison is made next of combined losses W of the copper loss Wcu and iron loss Wfe between motor 2 of the present invention and the conventional motor by referring to FIG. 9. As shown, motor 2 of the present invention has a smaller loss than the conventional motor when the rotating speed is 3,000 rpm or slower. On the other hand, the loss of motor 2 of the present invention becomes higher than the conventional motor when the rotating speed exceeds 3,000 rpm.

In laser printers used in recent years, the motors for feeding document papers are used generally at their rotating speeds in a range of 3,000 rpm or slower. Motor 2 of the present invention is therefore useful especially for feeding document papers in this type of laser printer.

Although extended portions $3b$ have been illustrated as being formed by bending sheet-like plates (high-permeability magnetic steel sheets) 30 on the upper and lower sides (i.e., those at the outermost layers) among the stacked sheet-like plates 30 that constitute laminated body 31 of stator 3, they need not be formed of the same material. In other words, extended portions $3b$ may be formed of a material different from the sheet-like plates stacked to compose the laminated body.

To be concrete, high-permeability magnetic steel sheets of a high silicon content are used for the sheet-like plates stacked to compose the laminated body up to magnetic polar bases $3d$ of stator 3, and high-permeability magnetic steel sheets having a silicon content equal to or lower than that of the stacked sheet-like plates are used for extended portions $3b$ extended from magnetic polar bases $3d$. Stator 3 of the above structure can improve the workability and achieve the motor of a high driving efficiency.

According to the present invention as discussed above, the magnetic poles of the stator are provided with the extended portions extended from the magnetic polar bases in the direction generally parallel to the permanent magnets. The extended portions have an extended length equal to or less than the length of magnetic polar bases in the direction generally parallel to the permanent magnets, and these extended portions are composed of the high-permeability magnetic steel sheets of silicon content less than 3.0 wt-%, preferably in a range of 0.3 to 3.0 wt-%, and more preferably in a range of 1.0 to 3.0 wt-%. Accordingly, the motor of the present invention has the structure of excellent workability and keeping the magnetic circuits communicating with the magnetic poles free from magnetic saturation, thereby improving the driving efficiency and achieving the high efficiency and low power consumption.

Second Exemplary Embodiment

Figure 10:
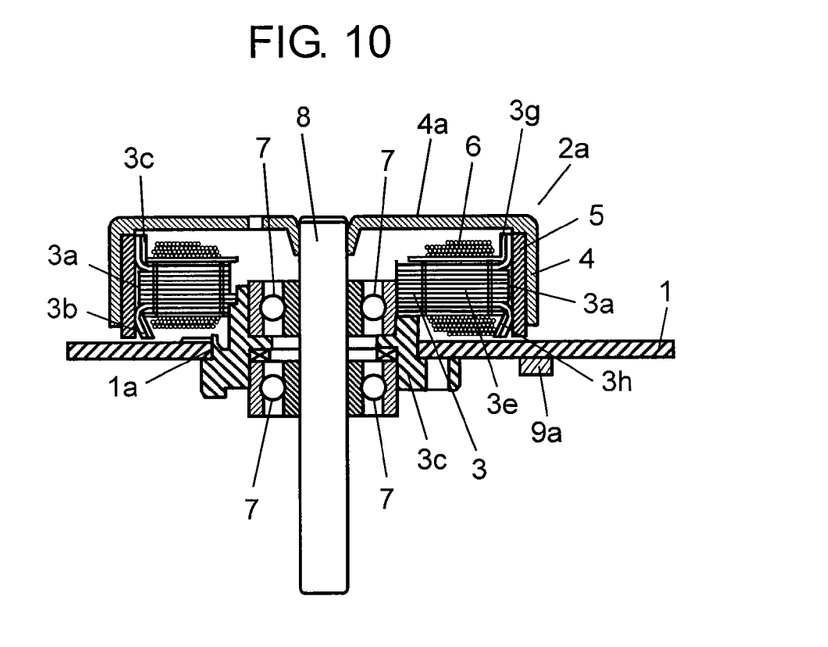
FIG. 10 is a sectional side view of a motor according to a second exemplary embodiment of the present invention.

FIG. 10 is a sectional side view showing motor $2a$ according to the second exemplary embodiment of the present invention. Like reference marks are used to designate like components as those of the first exemplary embodiment, and details of them will be skipped.

Motor $2a$ of this exemplary embodiment differs from motor 2 of the first exemplary embodiment in respect of that motor $2a$ is provided with upper extended portions $3g$ and lower extended portions 3 in place of upper and lower extended portions $3b$ of the first exemplary embodiment. In addition, Hall IC $9a$ serving as a magnetic sensing element is mounted on wiring board 1 in a position corresponding to the bottom side of permanent magnets 5. That is, Hall IC $9a$ is positioned on the underside surface of wiring board 1 in a manner to confront permanent magnets 5.

Upper extended portions $3g$ are formed at one side opposite Hall IC $9a$, lower extended portions $3h$ are formed at the other side confronting Hall IC $9a$, and that upper extended portions $3g$ and lower extended portions $3h$ are bent asymmetrical to each other in their cross-sectional shapes, as shown in FIG. 10. More specifically, lower extended portions $3h$ are bent into such a configuration that their tip ends are shifted further inward of stator 3 than that of upper extended portions $3g$. In other words, the above configuration of lower extended portions $3h$ provides a larger gap to permanent magnet 5 than that from upper extended portions $3g$.

Because of this configuration, the magnetic flux entering lower extended portions $3h$ at the side where the magnetic sensing element of Hall IC $9a$ is mounted becomes smaller as compared to the case in which lower extended portions $3h$ are bent downward into substantially a right angle, for instance, from magnetic polar bases $3d$. This increases the magnetic flux supplied to Hall IC $9a$ by an amount equivalent to what remains not taken by lower extended portions $3h$. This gives an advantage of mounting Hall IC $9a$ to the underside surface of wiring board 1, as shown in FIG. 10, and hence contributes to downsizing of the motor.

In the exemplary embodiment described above, although lower extended portions $3h$ are formed to have the tip ends shifted further inward of stator 3 than that of upper extended portions $3g$, these extended portions may have other form of asymmetrical configuration in their cross-sections.

Figure 11:
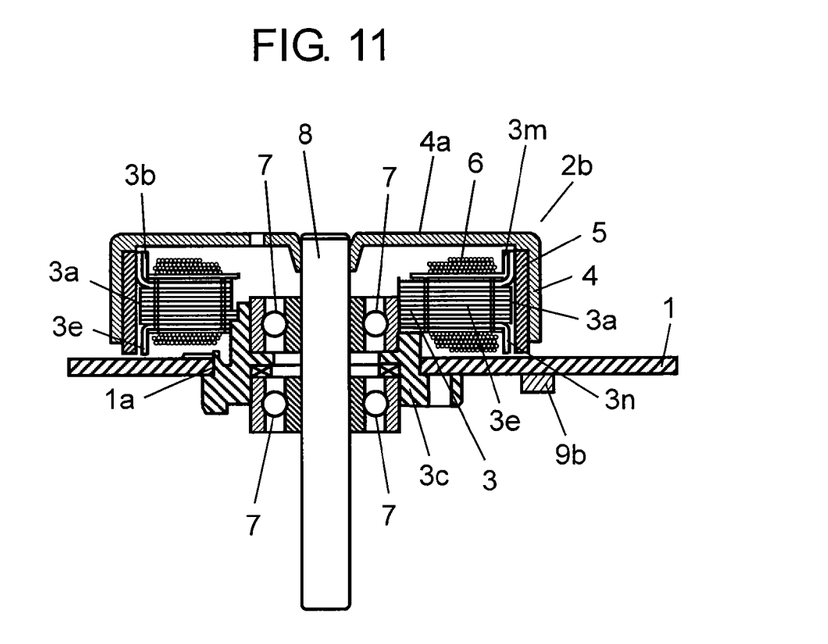
FIG. 11 is a sectional side view of another type of motor according to the second exemplary embodiment of the present invention.

Shown next in FIG. 11 is a sectional side view of another type motor $2b$ according to the second exemplary embodiment. Like reference marks are used to designate like components as those of the first exemplary embodiment, and details of them will be skipped.

In this exemplary embodiment, lower extended portions $3n$ at the side confronting Hall IC $9b$ are formed of a less number of sheet-like plate 30 than that of upper extended portions $3m$ at the side opposite Hall IC $9b$. More specifically, upper extended portions $3m$ are formed by bending two layers of sheet-like plate 30 including the outermost layer, and lower extended portions $3n$ are formed by bending a single sheet-like plate 30 on the outermost layer, both into generally right angles to make them substantially parallel to permanent magnets 5.

This structure increases the magnetic flux supplied to Hall IC 9*b* by an amount equivalent to what is not taken by lower extended portions 3*n*. It thus gives an advantage of mounting Hall IC 9*b* to the underside surface of wiring board 1, as shown in FIG. 11, and hence contributes to downsizing of the motor.

Besides the above exemplary embodiments, this invention may be practiced in various other ways, such that the lower extended portions are formed to have a length shorter than that of the upper extended portions.

Third Exemplary Embodiment

Figure 12:
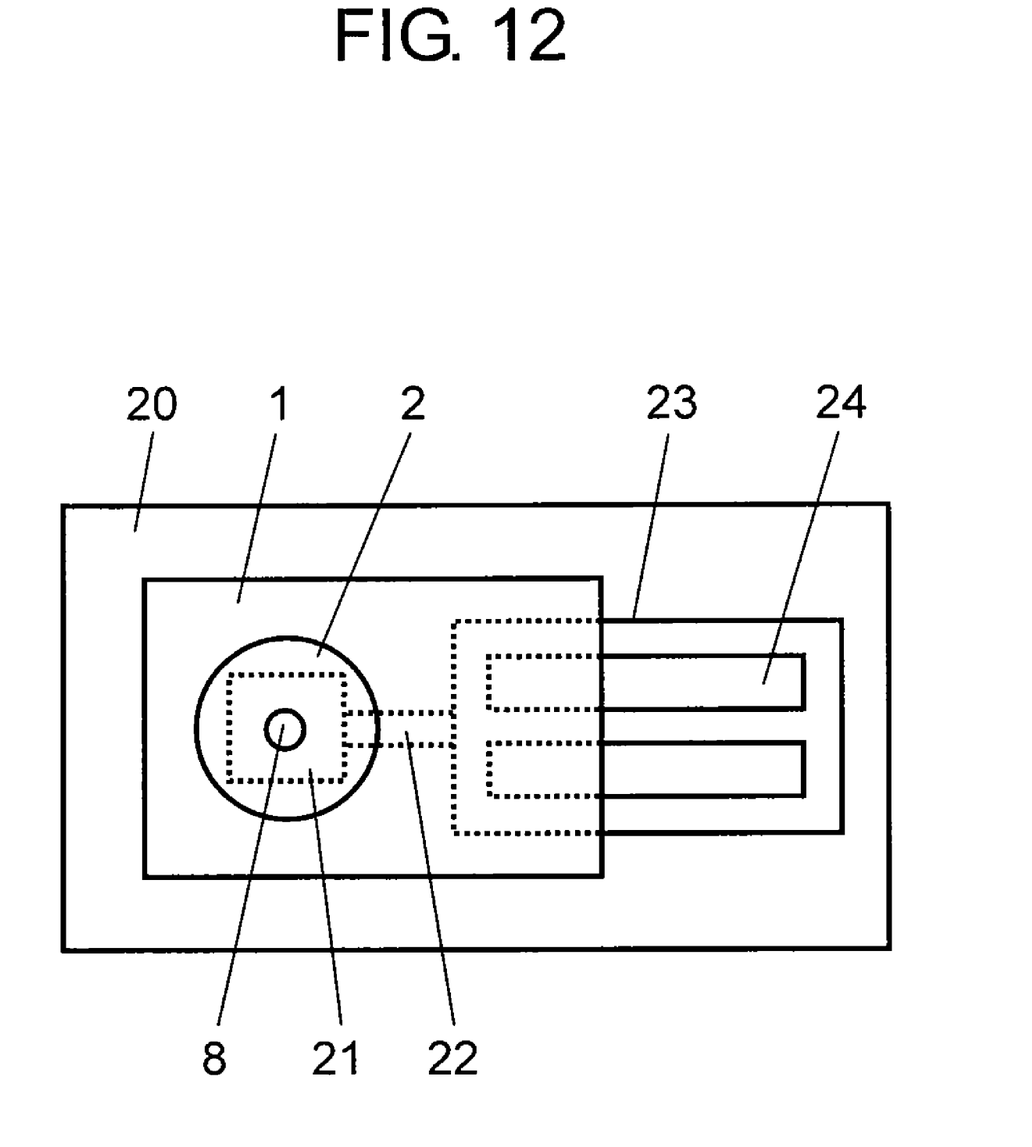
FIG. 12 is an explanatory drawing of an electronic device according to a third exemplary embodiment of the present invention.

FIG. 12 is an explanatory drawing of an electronic device (a laser printer for example) according to the third exemplary embodiment of the present invention. In FIG. 12, motor 2 described in the first exemplary embodiment is mounted on wiring board 1. Wiring board 1 also carries other electronic components (not shown) necessary for overall function of the electronic device.

A bottom end of drive shaft 8 of motor 2 penetrates through-hole 1*a* (shown in FIG. 1) of wiring board 1, and extends under wiring board 1. Gearbox 21 is linked to the bottom end of this drive shaft 8. As described in the first exemplary embodiment, magnetic sensing element 9 (Hall IC) mounted on this wiring board 1 detects a position of rotor 4. Motor 2 is driven to rotate at a speed of 3,000 rpm or slower, and this rotating speed is reduced by gearbox 21. A rotational driving force of motor 2 is transmitted via coupling mechanism 22 to driven unit 23 including a plurality of paper feed rollers 24. The plurality of paper feed rollers 24 are thus rotated to carry out the paper feeding operation. The electronic device of this exemplary embodiment may be provided with any of motor 2*a* and motor 2*b* illustrated in the second exemplary embodiment, in place of motor 2.

It becomes possible by virtue of this exemplary embodiment to improve a driving efficiency of the electronic device, thereby achieving a high efficiency and low power consumption.

INDUSTRIAL APPLICABILITY

According to the present invention, it becomes possible to improve driving efficiency of motors and achieve a high efficiency and low power consumption, and therefore applicable to a wide variety of electronic devices such as laser printers.

What is claimed is:

1. A motor comprising:
a stator having a plurality of magnetic poles disposed at first predetermined intervals along an outer periphery thereof; and
a rotor having a permanent magnet with poles magnetized alternately to have different polarities at second predetermined intervals and disposed rotatably around the outer periphery of the stator with a predetermined gap, wherein
the magnetic poles of the stator have laminated bodies formed by stacking sheet-like plates,
the laminated bodies have magnetic polar bases and extended portions formed in a manner to bend from the magnetic polar bases into a direction generally parallel to the permanent magnet,
the extended portions are provided individually at both sides of the magnetic polar base,
a total extending length of the extended portions at both sides in a direction parallel to the permanent magnet is set not to exceed a length of the magnetic polar base in the direction parallel to the permanent magnet, and
the extended portions are formed of a high-permeability magnetic steel sheet with silicon content within a range of 1.0 wt-% to 3.0 wt-%.

2. The motor of claim 1, wherein the silicon content of the high-permeability magnetic steel sheet is set within a range of 2.0 wt-% to 3.0 wt-%.

3. The motor of claim 1, wherein the rotor is driven at a rotating speed of 3,000 rpm or slower.

4. The motor of claim 1, wherein the magnetic polar bases are formed of a high-permeability magnetic steel sheet containing silicon, and silicon content of the high-permeability magnetic steel sheet forming the extended portions is equal to or lower than silicon content of the magnetic polar bases.

5. The motor in claim 1 further comprising
a magnetic sensing element disposed in a position corresponding to one side of the permanent magnet for detecting a rotating position of the rotor,
wherein the extended portions include an upper extended portion at one side opposite the magnetic sensing element and a lower extended portion at the other side confronting the magnetic sensing element, and
the gap at the lower extended portion is larger than that at the upper extended portion.

6. The motor in claim 1 further comprising a magnetic sensing element disposed in a position corresponding to one side of the permanent magnet for detecting a rotating position of the rotor, wherein the extended portions include an upper extended portion at one side opposite the magnetic sensing element and a lower extended portion at the other side confronting the magnetic sensing element, and a number of layers of the high-permeability magnetic steel sheet forming the lower extended portion is less than a number of layers of the high-permeability magnetic steel sheet forming the upper extended portion.

7. The motor of claim 6, wherein the lower extended portion is formed of a single layer of the high-permeability magnetic steel sheet and the upper extended portion is formed of two layers of the high-permeability magnetic steel sheet.

8. An electronic device comprising a main unit casing, a driven unit provided inside the main unit casing, and a motor connected to the driven unit via a coupling mechanism, wherein the motor comprising:
a stator having a plurality of magnetic poles disposed at first predetermined intervals along an outer periphery thereof; and
a rotor having a permanent magnet with poles magnetized alternately to have different polarities at second predetermined intervals and disposed rotatably around the outer periphery of the stator with a predetermined gap, further wherein:
the magnetic poles of the stator have laminated bodies formed by stacking sheet-like plates,
the laminated bodies have magnetic polar bases and extended portions formed in a manner to bend from the magnetic polar bases into a direction generally parallel to the permanent magnet,
the extended portions are provided individually at both sides of the magnetic polar base,
a total extending length of the extended portions at both sides in a direction parallel to the permanent magnet is set not to exceed a length of the magnetic polar base in the direction parallel to the permanent magnet, and
the extended portions are formed of a high-permeability magnetic steel sheet with silicon content within a range of 1.0 wt-% to 3.0 wt-%.

9. The electronic device of claim 8, wherein the silicon content of the high-permeability magnetic steel sheet is set within a range of 2.0 wt-% to 3.0 wt-%.

10. The electronic device of claim 8, wherein the motor is driven at a rotating speed of 3,000 rpm or slower.

11. The electronic device of claim 8 further comprising a wiring board disposed inside the main unit casing, wherein the motor is mounted on the wiring board, and a magnetic sensing element is disposed in a position of the wiring board confronting the permanent magnet for detecting a rotating position of the rotor.

12. The electronic device of claim 11, wherein the magnetic sensing element comprises a Hall IC.

* * * * *